United States Patent
Maki et al.

(10) Patent No.: US 10,782,415 B2
(45) Date of Patent: Sep. 22, 2020

(54) TIMING SIGNAL GENERATION DEVICE AND ELECTRONIC APPARATUS

(71) Applicant: Seiko Epson Corporation, Tokyo (JP)

(72) Inventors: Yoshiyuki Maki, Suwa (JP); Hiroyuki Shimada, Suwa (JP)

(73) Assignee: Seiko Epson Corporation (JP)

( * ) Notice: Subject to any disclaimer, the term of this patent is extended or adjusted under 35 U.S.C. 154(b) by 1233 days.

(21) Appl. No.: 15/064,847

(22) Filed: Mar. 9, 2016

(65) Prior Publication Data
US 2016/0274243 A1 Sep. 22, 2016

(30) Foreign Application Priority Data

Mar. 17, 2015 (JP) .................. 2015-054045

(51) Int. Cl.
*G01S 19/37* (2010.01)
*G01S 19/14* (2010.01)

(52) U.S. Cl.
CPC ..................... *G01S 19/14* (2013.01)

(58) Field of Classification Search
CPC ........ G01S 19/14; G01S 19/21; G01S 19/235; G01S 19/39; G01S 19/02; G01S 19/07; G01S 19/13; G01S 19/23; G01S 19/34; G01S 19/426; G01S 19/43; G01S 19/44; G01S 19/45; G01S 19/48; G01S 5/0263; G04R 20/02; G04R 40/06; G04R 20/04; G04R 20/06; G04R 20/16; G04G 3/02; G04G 5/00; G04G 7/02; G06F 1/14; H04B 7/2684

See application file for complete search history.

(56) References Cited

U.S. PATENT DOCUMENTS 6,480,145 B1 * 11/2002 Hasegawa ............. G01S 19/235
342/357.62

FOREIGN PATENT DOCUMENTS

| JP | 08-105984 A | 4/1996 |
| JP | 2001-242235 A | 9/2001 |
| JP | 2002-217722 A | 8/2002 |

* cited by examiner

*Primary Examiner* — Timothy A Brainard
(74) *Attorney, Agent, or Firm* — Harness, Dickey & Pierce, P.L.C.

(57) ABSTRACT

A timing signal generation device includes: an output terminal that outputs a standard signal; a first standard signal generation unit that generates a first standard signal based on a reference signal input from outside; a second standard signal generation unit that generates a second standard signal based on a signal output from an oscillator; and a control unit that switches the standard signal output from the output terminal from the first standard signal to the second standard signal based on prior information indicating that accuracy of the reference signal deteriorates.

20 Claims, 8 Drawing Sheets

TIMING SIGNAL GENERATION DEVICE AND ELECTRONIC APPARATUS

CROSS REFERENCE

This application claims benefit of Japanese Application No. 2015-054045, filed on Mar. 17, 2015. The disclosure of the prior application is hereby incorporated by reference herein in its entirety.

BACKGROUND

1. Technical Field

The present invention relates to a timing signal generation device and an electronic apparatus.

2. Related Art

The global positioning system (GPS) which is one of the global navigation satellite systems (GNSS) using artificial satellites is widely known. Atomic clocks with considerably high accuracy are mounted on GPS satellites used for the GPS. Satellite signals on which trajectory information of GPS satellites or accurate time information or the like is superimposed are transmitted to the ground. The satellite signals transmitted from the GPS satellites are received by GPS receivers. Then, the GPS receivers perform a process of calculating time information or the current positions of the GPS receivers based on the trajectory information or the time information superimposed on the satellite signals or a process of generating accurate timing signals (1 PPS) synchronized with coordinated universal time (UTC) or the like.

In such GPS receivers, a normal positioning (position estimation) mode providing a position and a time based on positioning calculation and a position fixing mode supplying a time by fixing positioning at a known position are generally provided.

In the normal positioning mode, satellite signals from GPS satellites equal to or greater than a predetermined number (minimum three satellites in the case of 2-dimensional positioning and four satellites in the case of 3-dimensional positioning) are necessary. As the number of GPS satellites capable of receiving satellite signals is larger, the accuracy of positioning calculation is further improved.

In the position fixing mode, when position information of a GPS receiver is set and a satellite signal from at least one GPS satellite can be received, a 1 PPS can be generated.

JP-A-8-105984 discloses a 1-second signal acquisition device that receives ranging radio waves transmitted from a plurality of artificial satellites and generates a 1 PPS (standard signal).

The 1-second signal acquisition device includes an antenna 2 that receives ranging radio waves transmitted from a plurality of artificial satellites 1, a GPS receiver 3 that is connected to the antenna 2, a 1 PPS validity determination unit 4 that is connected to the GPS receiver 3, a state determination unit 5 that is connected to the GPS receiver 3 and the 1 PPS validity determination unit 4, a timing circuit 6 that is connected to the 1 PPS validity determination unit 4 and the state determination unit 5, and a reference oscillator 7 in the device that is connected to the timing circuit 6, the PPS validity determination unit 4, and the state determination unit 5. A load-side device 8 such as a time-related device is connected to the timing circuit 6. The 1 PPS validity determination unit 4 determines validity of a 1 PPS output from the GPS receiver 3, that is, whether the 1 PPS is continuous at a correct timing of 1 Hz.

When the 1 PPS is valid, the 1-second signal acquisition device outputs a 1 PPS output from the GPS receiver 3. When the 1 PPS is not valid, the 1-second signal acquisition device outputs a 1 PPS output from the reference oscillator 7 in the device.

In the 1-second signal acquisition device disclosed in JP-A-8-105984, however, even when the 1 PPS is not valid, the 1 PPS output from the GPS receiver 3 is output in some cases during the determination regarding whether the 1 PPS output from the GPS receiver 3 is valid. Therefore, there is the problem that accuracy of the 1 PPS may not be ensured.

SUMMARY

An advantage of some aspects of the invention is to provide a timing signal generation device and an electronic apparatus capable of ensuring temporal accuracy of a standard signal.

The invention can be implemented as the following forms or application examples.

Application Example 1

A timing signal generation device according to this application example includes: an output terminal that outputs a standard signal; a first standard signal generation unit that generates a first standard signal based on a reference signal input from outside; a second standard signal generation unit that generates a second standard signal based on a signal output from an oscillator; and a control unit that switches the standard signal output from the output terminal from the first standard signal to the second standard signal based on prior information indicating that accuracy of the reference signal deteriorates.

With this configuration, the standard signal can be switched from the first standard signal to the second standard signal before accuracy of the reference signal deteriorates more than the lower limit of an allowable range. Accordingly, it is possible to ensure temporal accuracy of the standard signal.

Application Example 2

It is preferable that the timing signal generation device according to the application example further includes a prior information output unit that outputs the prior information to the control unit.

With this configuration, the control unit switches the standard signal from the first standard signal to the second standard signal based on the prior information before the accuracy of the reference signal deteriorates more than the lower limit of the allowable range.

Application Example 3

In the timing signal generation device according to the application example, it is preferable that the prior information output unit includes a prior information storage unit that stores the prior information.

With this configuration, by using the prior information stored in the prior information storage unit, it is possible to omit an effort to input the prior information every time.

Application Example 4

In the timing signal generation device according to the application example, it is preferable that the prior information output unit includes a prior information generation unit that generates the prior information based on the reference signal in advance.

With this configuration, it is possible to obtain more accurate prior information.

Application Example 5

It is preferable that the timing signal generation device according to the application example further includes a time information storage unit that stores time information. The control unit preferably includes a switch timing decision unit that decides a switch timing of the standard signal based on the prior information and the time information.

With this configuration, before the accuracy of the reference signal deteriorates more than the lower limit of the allowable range, it is possible to set any switch timing of the standard signal.

Application Example 6

In the timing signal generation device according to the application example, it is preferable that the reference signal is a satellite signal transmitted from a position information satellite, the prior information output unit outputs DOP information indicating a relation between a time and an accuracy deterioration rate of positioning based on the reference signal as information indicating that the accuracy of the reference signal deteriorates to the switch timing decision unit, and the switch timing decision unit includes a threshold value storage unit that stores a threshold value and decides the switch timing of the standard signal based on the threshold value and the DOP information.

With this configuration, until an accuracy deterioration rate of positioning based on the reference signal becomes a certain value, it is possible to arbitrarily set whether the first standard signal is output as the standard signal.

Application Example 7

In the timing signal generation device according to the application example, it is preferable that the oscillator is a voltage control oscillator, the first standard signal generation unit inputs a control voltage of the oscillator to the oscillator and generates the first standard signal based on the reference signal when the accuracy deterioration rate is equal to or less than the threshold value, and the control unit acquires information regarding a control voltage of the oscillator input to the oscillator when the accuracy deterioration rate is equal to or less than the threshold value, and the control unit obtains a control voltage input to the oscillator based on the acquired information regarding the control voltage and inputs the obtained control voltage to the oscillator to switch the reference signal output from the output terminal from the first standard signal to the second standard signal when the accuracy deterioration rate exceeds the threshold value.

With this configuration, when the second standard signal is output, aging correction of the oscillator can be performed. Therefore, it is possible to improve the temporal accuracy of the second standard signal.

Application Example 8

In the timing signal generation device according to the application example, it is preferable that the reference signal is a satellite signal transmitted from a position information satellite, and the first standard signal generation unit preferably includes a receiver that receives the satellite signal.

With this configuration, it is possible to receive the satellite signals and generate the first standard signal.

Application Example 9

In the timing signal generation device according to the application example, it is preferable that the prior information includes information indicating that the accuracy of the reference signal improves, and the control unit switches the standard signal output from the output terminal from the second standard signal to the first standard signal based on the prior information.

With this configuration, when the accuracy of the reference signal deteriorates more than the lower limit of the allowable range and subsequently becomes equal to or greater than the lower limit, it is possible to switch the standard signal from the second standard signal to the first standard signal. Accordingly, it is possible to further improve the temporal accuracy of the standard signal.

Application Example 10

A timing signal generation device according to this application example switches, based on prior information indicating that accuracy of a reference signal input from outside deteriorates, a signal used to generate a standard signal from the reference signal to a signal output from an internal oscillator.

With this configuration, it is possible to switch the standard signal from the first standard signal to the second standard signal before the accuracy of the reference signal deteriorates more than the lower limit of the allowable range. Accordingly, it is possible to ensure the temporal accuracy of the standard signal.

Application Example 11

An electronic apparatus according to this application example includes the timing signal generation device according to the application example.

With this configuration, it is possible to switch the standard signal from the first standard signal to the second standard signal before the accuracy of the reference signal deteriorates more than the lower limit of the allowable range. Accordingly, it is possible to ensure the temporal accuracy of the standard signal.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a timing signal generation device and an electronic apparatus according to the invention will be described in detail according to embodiments illustrated in the appended drawings.

1. Timing Signal Generation Device

First Embodiment

Figure 1:
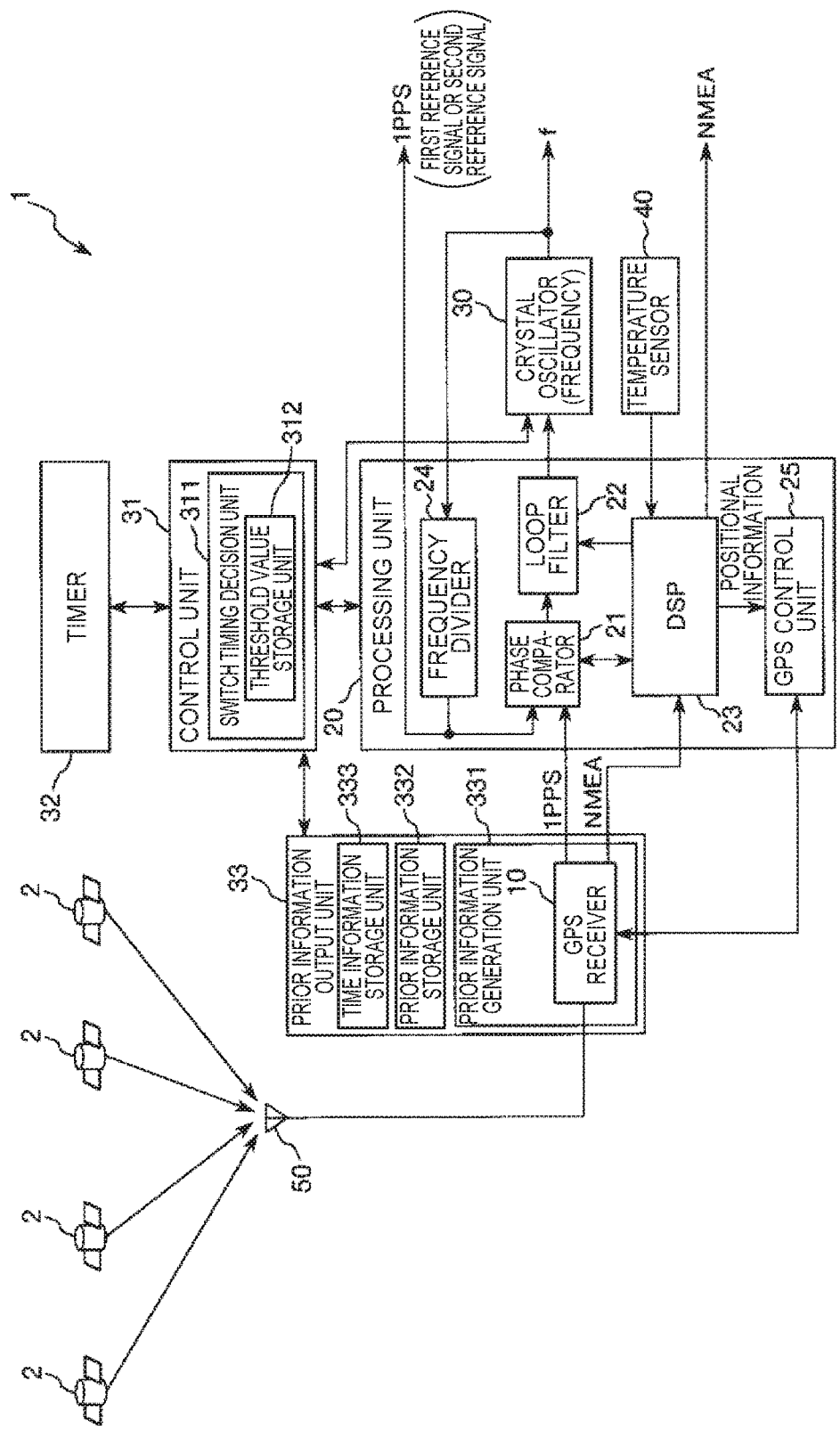
FIG. 1 is a diagram illustrating a schematic configuration of a first embodiment of a timing signal generation device according to the invention.
Figure 2A:
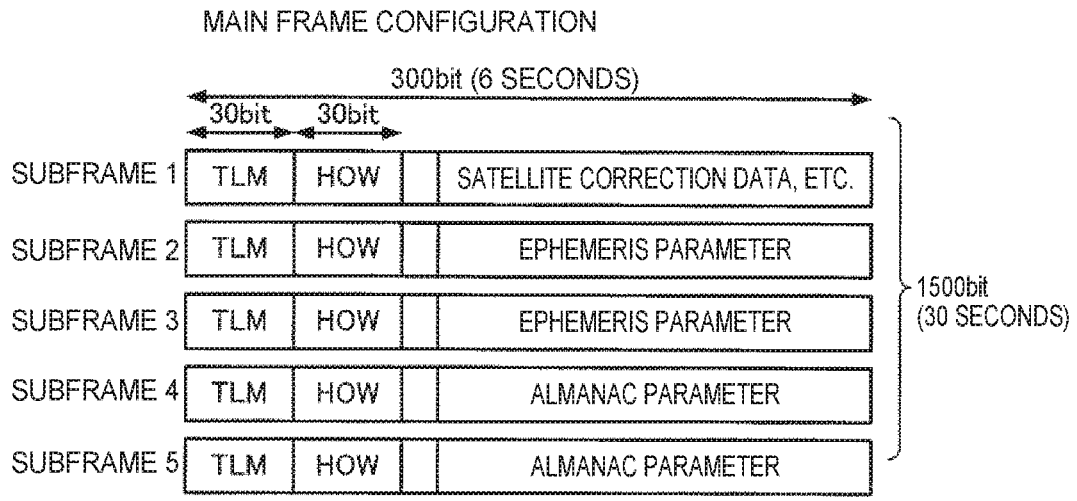
FIGS. 2A to 2C are diagrams illustrating the configuration of a navigation message transmitted from a GPS satellite.
Figure 2B:
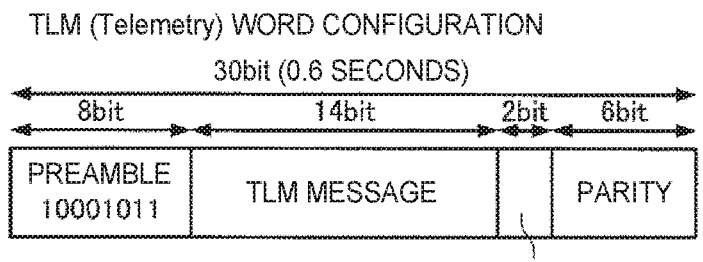
Figure 2C:
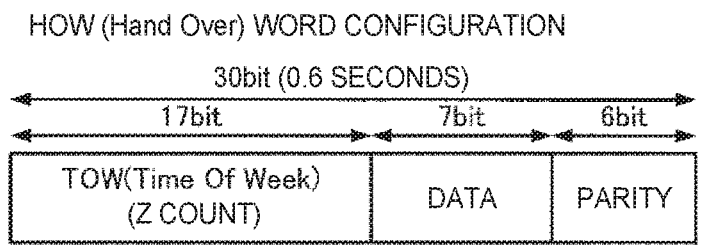
Figure 3:
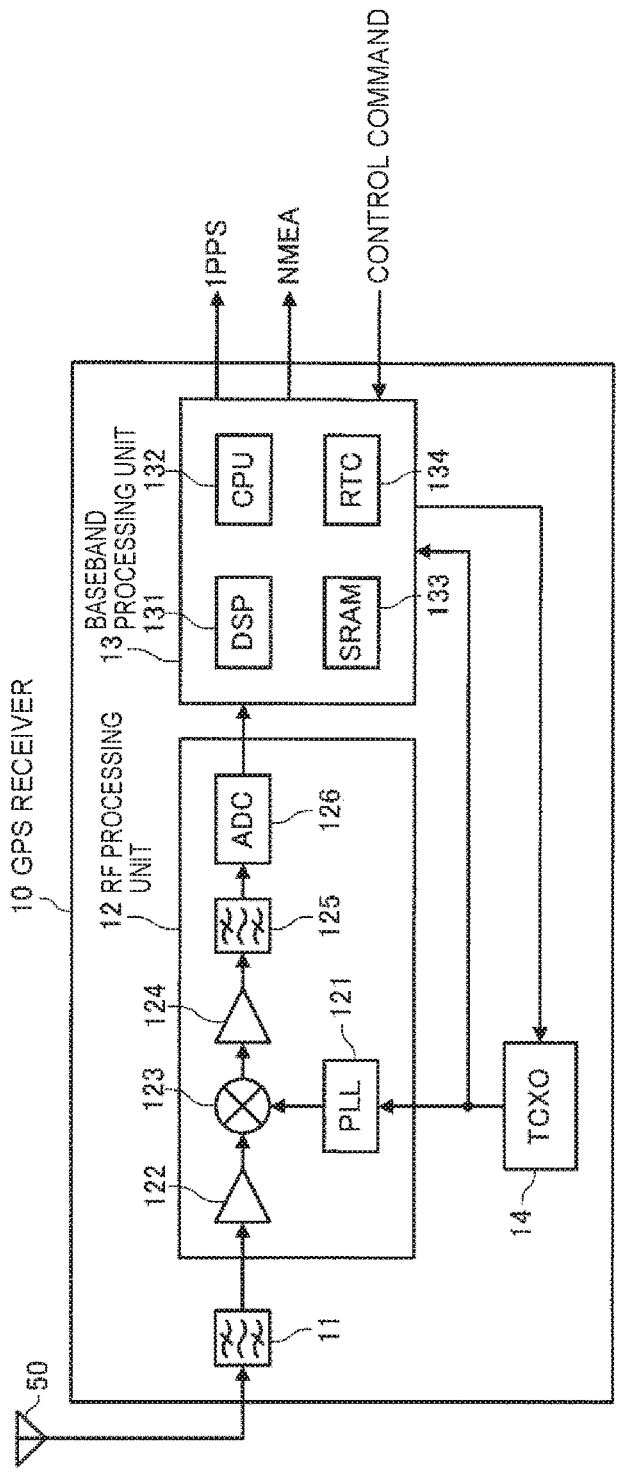
FIG. 3 is a block diagram illustrating an example of the configuration of a GPS receiver included in the timing signal generation device illustrated in FIG. 1.
Figure 4:
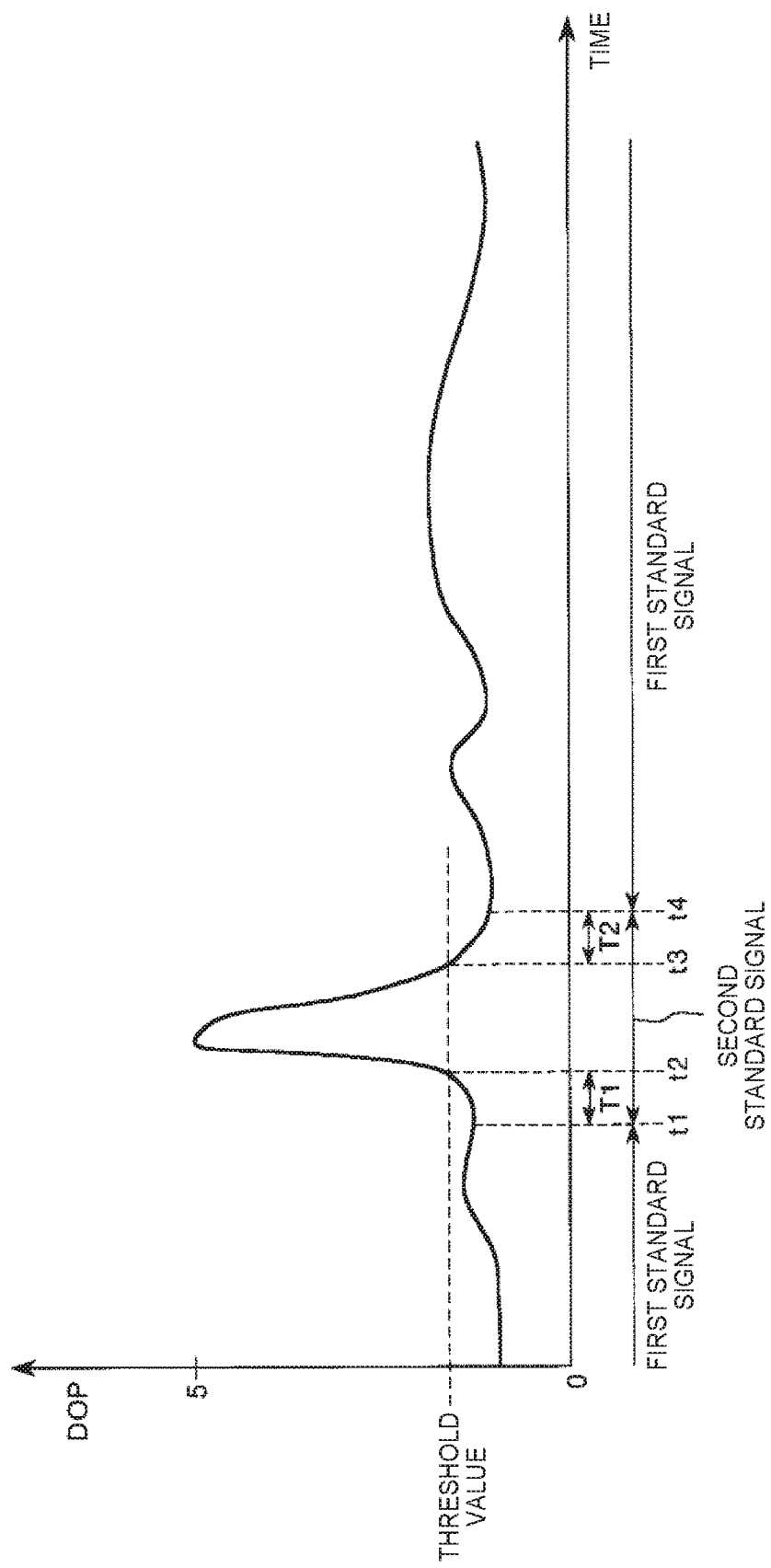
FIG. 4 is a graph illustrating a relation between a time and an accuracy deterioration rate of a satellite signal in the timing signal generation device illustrated in FIG. 1.
Figure 5:
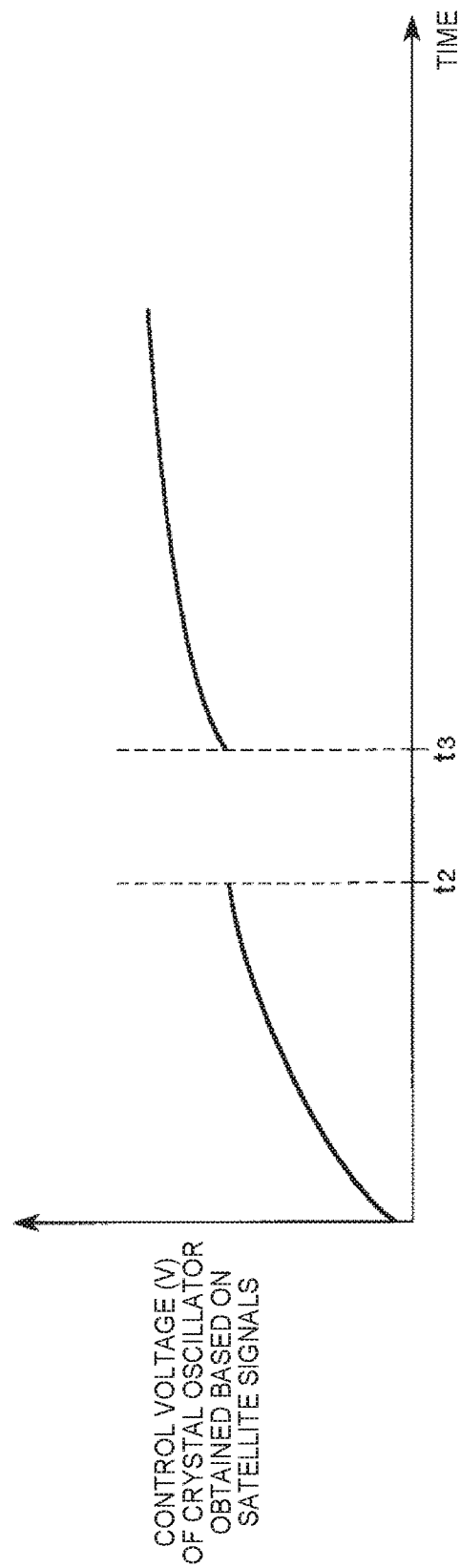
FIG. 5 is a graph illustrating a relation between a time and a control voltage obtained based on the satellite signal and input to a crystal oscillator in the timing signal generation device illustrated in FIG. 1.

FIG. 1 is a diagram illustrating a schematic configuration of a first embodiment of a timing signal generation device according to the invention. FIGS. 2A to 2C are diagrams illustrating the configuration of a navigation message transmitted from a GPS satellite. FIG. 3 is a block diagram illustrating an example of the configuration of a GPS receiver included in the timing signal generation device illustrated in FIG. 1. FIG. 4 is a graph illustrating a relation between a time and an accuracy deterioration rate of a satellite signal in the timing signal generation device illustrated in FIG. 1. FIG. 5 is a graph illustrating a relation between a time and a control voltage obtained based on the satellite signal and input to a crystal oscillator in the timing signal generation device illustrated in FIG. 1.

A timing signal generation device 1 illustrated in FIG. 1 includes a GPS receiver (receiver) 10 serving as a satellite signal reception unit, a processing unit (CPU) 20 serving as a satellite signal reception control device, a crystal oscillator (oscillator) 30 serving as a voltage control oscillator (VCO), a temperature sensor 40, a control unit 31, a timer (clock) 32, a prior information output unit 33, and a GPS antenna 50.

Some or all of the constituent elements of the timing signal generation device 1 may be physically separated or may be integrated. For example, the GPS receiver 10 and the processing unit 20 may be realized by separate ICs. The GPS receiver 10 and the processing unit 20 may be realized by one IC. The same applies to the other portions.

The timing signal generation device 1 receives signals transmitted from GPS satellites (positional information satellites) 2 and generates a highly accurate 1 PPS.

The GPS satellites 2 orbit along predetermined trajectories above the earth and transmit satellite signals (GPS signals) in which navigation messages and coarse/acquisition codes (C/A codes) are superimposed (carrier waves are modulated) on radio waves (L1 waves) with 1.57542 GHz which are carrier waves to the ground. The satellite signal is an example of a reference signal input from the outside to the timing signal generation device 1.

The C/A codes are used to identify the satellite signals of the GPS satellites 2 which are currently about 30 satellites and are unique patterns formed from 1023 chips (a period of 1 ms) for which each chip is one of +1 and −1. Accordingly, by taking a correlation of the satellite signal and the pattern of each C/A code, it is possible to detect the C/A code superimposed on the satellite signal.

The satellite signal (specifically, a navigation message) transmitted by each GPS satellite 2 includes trajectory information indicating the position of each GPS satellite 2 along the trajectory. An atomic clock is mounted on each GPS satellite 2 and the satellite signal includes considerably accurate time information clocked by the atomic clock. Accordingly, by receiving the satellite signals from four or more of the GPS satellites 2 and performing positioning calculation using the trajectory information and the time information included in each satellite signal, it is possible to obtain accurate information regarding the position and time of a reception point (an installation place of the GPS antenna 50). Specifically, a quartic equation that has 3-dimensional positions (x, y, z) and a time t of a reception point as four variables may be established to obtain its solution.

When the position of the reception point is known, the satellite signals can be received from one or more of the GPS satellites 2 and the time information of the reception point can be obtained using time information included in each satellite signal.

Information regarding a difference between the time of each GPS satellite 2 and the time of the reception point can be obtained using the trajectory information included in each satellite signal. A slight time error between the atomic clocks mounted on the GPS satellites 2 is measured by a control segment on the ground and a time correction parameter for correcting the time error is also included in the satellite signal. By correcting the time of the reception point using the time correction parameter, it is possible to obtain the considerably accurate time information.

As illustrated in FIG. 2A, the navigation message is configured to include data for which a main frame of a total number of 1500 bits is one unit. The main frame is divided into five subframes 1 to 5 which each have 300 bits. Data of one subframe is transmitted in 6 seconds from each GPS satellite 2. Accordingly, the data of one main frame is transmitted in 30 seconds from each GPS satellite 2.

The subframe 1 includes satellite correction data such as week number data (WN). The week number data is information that indicates a week including a time of the GPS satellite 2. A starting point of the time of the GPS satellite 2 is 00:00:00, 6 Jan. 1980 of the UTC (the world standard time) and a week starting from that day has a week number of 0. The week number data is updated in units of one week.

The subframes 2 and 3 include an ephemeris parameter (detailed trajectory information of each GPS satellite 2). The subframes 4 and 5 include an almanac parameter (schematic trajectory information of all the GPS satellites 2).

The head of each of the subframes 1 to 5 includes a TLM (Telemetry) word in which telemetry word (TLM) data of 30 bits are stored and a HOW word in which handover word (HOW) data of 30 bits are stored.

Accordingly, the TLM word and the HOW word are transmitted at intervals of 6 seconds from the GPS satellites 2, and the satellite correction data such as the week number data, the ephemeris parameter, and an almanac parameter are transmitted at intervals of 30 seconds.

As illustrated in FIG. 2B, the TLM word includes preamble data, a TLM message, reserved bits, and parity data.

As illustrated in FIG. 2C, the HOW word includes time information called time of week (TOW) (hereinafter also referred to as a "Z count"). In Z count data, an elapsed time is displayed in seconds from 00:00:00 of every Sunday and is returned to 0 at 00:00:00 on the following Sunday. That is, the Z count data is information in units of seconds indicated from the beginning of a week once a week and the elapsed time is a number expressed in units of 1.5 seconds. Here, the Z count data indicates time information in which the first bit of subsequent subframe data is transmitted. For example, the Z count data of the subframe 1 indicates time information in which the first bit of the subframe 2 is transmitted. The HOW word includes 3-bit data (ID code) indicating the ID of the subframe. That is, the HOW words of the subframes 1 to 5 illustrated in FIG. 2A respectively include the ID codes of "001", "010", "011", "100", and "101".

By acquiring the week number data included in the subframe 1 and the HOW words (Z count data) included in the subframes 1 to 5, it is possible to calculate the time of the GPS satellite 2. When the week number data is acquired previously and the elapsed time from a period in which the week number data is acquired is counted internally, the current week number data of the GPS satellite 2 can be obtained even without acquiring the week number data every time. Accordingly, when only the Z count data is acquired, the current time of the GPS satellite 2 can be approximately estimated.

The above-described satellite signals are received by the GPS receiver 10 via the GPS antenna 50 illustrated in FIG. 1.

The GPS antenna 50 is an antenna that receives various radio waves including the satellite signals and is connected to the GPS receiver 10.

The GPS receiver 10 performs various processes based on the satellite signals received via the GPS antenna 50.

Specifically, the GPS receiver 10 has a normal positioning mode (first mode) and a position fixing mode (second mode) and is set to one of the normal positioning mode and the position fixing mode according to a control command (a control command for mode setting) from the processing unit (CPU) 20.

In the normal positioning mode, the GPS receiver 10 functions as a "positioning calculation unit", receives the satellite signals transmitted from the plurality of GPS satellites 2 (preferably, four or more of the GPS satellites), and performs positioning calculation based on the trajectory information (specifically, the ephemeris data, the almanac data, and the like described above) and the time information (specifically, the week number data, the Z count data, and the like described above) included in the received satellite signals. The GPS receiver 10 generates a 1 PPS to be described below.

In the position fixing mode, the GPS receiver 10 functions as a "timing signal generation unit", receives the satellite signals transmitted from one or more of the GPS satellites 2, and generates a 1 pulse per second (1 PPS) based on the trajectory information and the time information included in the received satellite signals and the positional information of the set reception point. The 1 PPS (which is an example of a timing signal synchronized with a reference time) is a pulse signal which is completely synchronized with the UTC (the world standard time), and includes 1 pulse per second. In this way, when the satellite signals used for the GPS receiver 10 to generate the timing signal include the trajectory information and the time information, the timing signal accurately synchronized with the reference time can be generated.

Hereinafter, the configuration of the GPS receiver 10 will be described in detail.

The GPS receiver 10 illustrated in FIG. 3 includes a surface acoustic wave (SAW) filter 11, an RF processing unit 12, a baseband processing unit 13, and a temperature compensated crystal oscillator (TCXO) 14.

The SAW filter 11 performs a process of extracting the satellite signals from the radio waves received by the GPS antenna 50. The SAW filter 11 is configured as a bandpass filter that passes a signal of 1.5 GHz bandwidth.

The RF processing unit 12 includes a phase locked loop (PLL) 121, a low noise amplifier (LNA) 122, a mixer 123, an IF amplifier 124, an intermediate frequency (IF) filter 125, and an A/D converter (ADC) 126.

The PLL 121 generates a clock signal in which an oscillation signal of the TOXO 14 oscillating at about a few MHz is multiplied by a frequency of 1.5 GHz bandwidth.

The satellite signals extracted by the SAW filter are amplified by the LNA 122. The satellite signals amplified by the LNA 122 are mixed with the clock signal output by the PLL 121 in the mixer 123 to be down-converted to a signal (IF signal) with an intermediate frequency bandwidth (for example, a few MHz). The signal mixed by the mixer 123 is amplified by the IF amplifier 124.

Since a high frequency signal of a GHz order is generated along with the IF signal through the mixing by the mixer 123, the IF amplifier 124 also amplifies the high frequency signal along with the IF signal. The IF filter 125 passes the IF signal and removes the high frequency signal (precisely, attenuates the high frequency signal to a level equal to or less than a predetermined level). The IF signal which has passed through the IF filter 125 is converted into a digital signal by the A/D converter (ADC) 126.

The baseband processing unit 13 includes a digital signal processor (DSP) 131, a central processing unit (CPU) 132, a static random access memory (SRAM) 133, and a real time clock (RTC) 134 and performs various processes using the oscillation signal of the TCXO 14 as a clock signal.

The DSP 131 and the CPU 132 cooperate to demodulate the baseband signal from the IF signal, acquire the trajectory information or the time information included in the navigation message, and perform a process of the normal positioning mode or a process of the position fixing mode.

The SRAM 133 stores the acquired time information and trajectory information, the positional information of the reception point set according to a predetermined control command (a control command for position setting), an elevation angle mask used in the position fixing mode or the like. The RTC 134 generates a timing at which baseband processing is performed. The RTC 134 is up-counted with the clock signal from the TCXO 14.

Specifically, the baseband processing unit 13 performs a process (satellite searching) of generating a local code with the same pattern as each C/A code and taking correlation between the local code and each C/A code included in the baseband signal. Then, the baseband processing unit 13 adjusts a generation timing of the local code so that the correlation value with each local code is peak and determines that the local code is synchronized with the GPS satellite 2 using the C/A code (captures the GPS satellite 2) when a correlation value is equal to or greater than a threshold value. In the GPS, a code division multiple access (CDMA) scheme is adopted in which all of the GPS satellites 2 transmit the satellite signals with the same frequency using different C/A codes. Accordingly, by determining the C/A codes included in the received satellite signals, it is possible to search for the GPS satellites 2 which can be captured.

The baseband processing unit 13 performs a process of mixing the baseband signal and the local code with the same pattern as the C/A code of the captured GPS satellite 2 to acquire the trajectory information and the time information of this GPS satellite 2. The navigation message including the trajectory information and the time information of the captured GPS satellite 2 is demodulated to the mixed signal. Then, the baseband processing unit 13 performs a process of acquiring the trajectory information and the time information included in the navigation message and storing the trajectory information and the time information in the SRAM 133.

The baseband processing unit 13 receives the predetermined control command (specifically, the control command for the mode setting) and is set to either the normal positioning mode or the position fixing mode. In the normal positioning mode, the baseband processing unit 13 performs the positioning calculation using the trajectory information and the time information of four or more of the GPS satellites 2 stored in the SRAM 133.

In the position fixing mode, the baseband processing unit 13 outputs the highly accurate 1 PPS using the trajectory information of one or more of the GPS satellites 2 stored in the SRAM 133 and the positional information of the reception point stored in the SRAM 133. Specifically, the baseband processing unit 13 includes a 1 PPS counter that counts a generation timing of each pulse of the 1 PPS in a part of the RTC 134, calculates a propagation delay time necessary for the satellite signal transmitted from the GPS satellite 2 to arrive at the reception point using the trajectory information of the GPS satellite 2 and the positional information of the reception point, and changes a set value of the 1 PPS counter to an optimum value based on the propagation delay time.

In the normal positioning mode, the baseband processing unit 13 outputs the 1 PPS based on the time information of the reception point obtained through the positioning calculation.

In the position fixing mode, the positioning calculation may be performed when the plurality of GPS satellites 2 can be captured.

The baseband processing unit 13 outputs NMEA data including various kinds of information such as positional information or time information of the result of the positioning calculation and a reception status (the number of captured GPS satellites 2, the intensities of the satellite signals, and the like).

The operation of the GPS receiver 10 having the above-described configuration is controlled by the processing unit (CPU) 20 illustrated in FIG. 1.

The processing unit 20 transmits various control commands on the GPS receiver 10, controls the operation of the GPS receiver 10, and receives the 1 PPS and the NMEA data, and performs various processes output by the GPS receiver 10. For example, the processing unit 20 may perform various processes according to programs stored in any memory.

The processing unit 20 includes a phase comparator 21, a loop filter 22, a digital signal processor (DSP: position information generation unit) 23, a frequency divider 24, and a GPS control unit (reception control unit) 25. The DSP 23 and the GPS control unit 25 may be configured by one component.

The DSP 23 acquires the NMEA data from the GPS receiver 10 periodically (for example, per second), collects positional information (the result of the positioning result in the normal positioning mode by the GPS receiver 10) including the NMEA data to generate statistical information at a predetermined time, and performs a process of generating the positional information of the reception point based on the statistical information. In particular, the positional information of the reception point is generated based on a representative value (for example, an average value, a mode, or a median value) of the plurality of positioning calculation results in the normal positioning mode by the GPS receiver 10.

The GPS control unit 25 transmits various control commands to the GPS receiver 10 and controls the operation of the GPS receiver 10. Specifically, the GPS control unit 25 transmits the control command for the mode setting to the GPS receiver 10 and performs a process of switching the mode of the GPS receiver 10 from the normal positioning mode to the position fixing mode. The GPS control unit 25 transmits the control command for the position setting before the switching of the mode of the GPS receiver 10 from the normal positioning mode to the position fixing mode to the GPS receiver 10 and performs a process of setting the positional information of the reception point generated by the DSP 23 in the GPS receiver 10.

The frequency divider 24 performs f (where f is a frequency) division on the clock signal output by the crystal oscillator 30 and outputs the frequency-divided clock signal of 1 Hz.

The phase comparator 21 compares the phases of the 1 PPS output by the GPS receiver 10 and the frequency-divided clock signal of 1 Hz output by the frequency divider 24. A phase difference signal of a comparison result of the phase comparator 21 is input to the crystal oscillator 30 via the loop filter 22. The parameter of the loop filter 22 is set by the DSP 23.

The frequency-divided clock signal of 1 Hz output by the frequency divider 24 is synchronized with the 1 PPS output by the GPS receiver 10, and the timing signal generation device 1 outputs the frequency-divided clock signal as the 1 PPS with considerably high accuracy synchronized with the UTC to the outside. The 1 PPS is referred to as a "first standard signal". The GPS receiver 10, the processing unit 20, and the crystal oscillator 30 form main units of a first standard signal generation unit.

Under the control of the control unit 31, the processing unit 20 stops the process of synchronizing the clock signal output by the crystal oscillator 30 to the 1 PPS output by the GPS receiver 10, stops outputting the first standard signal, causes the crystal oscillator 30 to perform free-running oscillation, and outputs the 1 PPS to the outside instead of the first standard signal. The 1 PPS is referred to as "second standard signal". The crystal oscillator 30 and the frequency divider 24 form main units of a second standard signal generation unit.

The switch between the first and second standard signals is performed based on the prior information to be described below, which will be described in detail below.

When a situation (holdover) in which the GPS receiver 10 may not receive the satellite signals other than an assumed situation occurs, the accuracy of the 1 PPS output by the GPS receiver 10 deteriorates or the outputting of the 1 PPS by the GPS receiver 10 is stopped. However, even in this case, the second standard signal may be output.

The timing signal generation device 1 outputs the recent NMEA data per second to the outside in synchronization with the 1 PPS and outputs the clock signal with the frequency of f output by the crystal oscillator 30 to the outside.

The crystal oscillator 30 is not particularly limited and, for example, a thermostatic chamber type crystal oscillator (OCXO) and a temperature compensation type crystal oscillator (TCXO) can be exemplified. In the embodiment, the crystal oscillator 30 is used as an oscillator, but the invention is not limited thereto. For example, an atomic oscillator may be used as the oscillator.

The crystal oscillator 30 is configured to be able to minutely adjust the frequency according to an output voltage (control voltage) of the loop filter 22. As described above, the phase comparator 21, the loop filter 22, the DSP 23, and the frequency divider 24 completely synchronize the clock signal output by the crystal oscillator 30 with the 1 PPS output by the GPS receiver 10. That is, a configuration formed by the phase comparator 21, the loop filter 22, the DSP 23, and the frequency divider 24 functions as a "synchronization control unit" that synchronizes the clock signal output by the crystal oscillator 30 with the 1 PPS. The temperature sensor 40 is disposed near the crystal oscillator 30. The DSP 23 also performs a process of performing temperature compensation of frequency temperature characteristics of the crystal oscillator 30 by adjusting the output voltage of the phase comparator 21 according to a detected value (detected temperature) of the temperature sensor 40.

As illustrated in FIG. 1, the control unit 31 includes a switch timing decision unit 311. The switch timing decision unit 311 includes a threshold value storage unit 312. The control unit 31 is configured to include, for example, a CPU and a memory and controls, for example, an operation of switching between the first and second standard signals in the processing unit 20.

The prior information output unit 33 includes a prior information generation unit 331, a prior information storage unit 332, and a time information storage unit 333. The prior information generation unit 331 includes the above-described GPS receiver 10.

In the timing signal generation device 1, the prior information is stored in the prior information storage unit 332 in advance and the 1 PPS (standard signal) output from an output terminal electrically connected to the processing unit 20 to the outside is switched from one of the first and second standard signals to the other based on the prior information. Hereinafter, "outputting the standard signal from the output terminal electrically connected to the processing unit 20 to the outside" is simply referred to as "outputting the standard signal". Further, "switching the standard signal from one of the first and second standard signals to the other" is simply referred to as "switching the standard signal".

The reason for switching the standard signal is, for example, that the position of the GPS satellite 2 is bad, the accuracy of the 1 PPS output by the GPS receiver 10 deteriorates, and thus the accuracy of the first standard signal deteriorates. Accordingly, when the position of the GPS satellite 2 is good, the first reference signal is output as the standard signal. When the position of the GPS satellite 2 is bad, the second standard signal is output as the standard signal.

Information based on the position of the GPS satellite 2 can be exemplified as the prior information. The prior information is information which can be obtained in advance.

Specifically, examples of the prior information include positional information indicating a relation between a time and the position of the GPS satellite 2 with respect to the reception point (the installation place of the GPS antenna 50), DOP information indicating a relation between a time and dilution of precision (DOP) such as position dilution of precision (PDOP), and reception sensitivity information indicating a relation between a time and reception sensitivity of the satellite signal by the GPS receiver 10. Such information includes information indicating deterioration or improvement in the accuracy of the satellite signal such as the 1 PPS.

The "DOP" is a numerical value (index) indicating the degree of deterioration in the accuracy of the positioning based on the satellite signals received by the GPS receiver 10, that is, an accuracy deterioration rate. The lower the DOP is, the better the accuracy is. Further, the "PDOP" is a subordinate concept of the DOP and is a numerical value (index) indicating the degree of deterioration in the accuracy of the positioning based on the satellite signals received by the GPS receiver 10, that is, a position accuracy deterioration rate. The lower the PDOP is, the better the accuracy is. In the embodiment, a case in which the DOP information is used as the prior information will be described as a representative example. A relation between a time and the DOP is not uniform every day and is shifted every day. Therefore, the prior information such as the DOP information is generated in addition to the shift.

Next, a conversion timing of the standard signal will be described.

First, a threshold value indicating the lower limit of an allowable range of the DOP is set. This threshold value is stored in advance in the threshold value storage unit 312.

The threshold value is not particularly limited and is appropriately set according to all the conditions. The threshold value is preferably equal to or less than 3, is more preferably equal to or less than 2, and is still more preferably equal to or greater than 1.05 and equal to or less than 1.5.

When the threshold value is greater than the upper limit of the allowable range, the accuracy of the first standard signal is insufficient in some cases depending on other conditions.

The prior information output unit 33 outputs the DOP information to the switch timing decision unit 311 of the control unit 31. Then, the switch timing decision unit 311 decides the switch timing of the standard signal in the following way based on the DOP information and the threshold value, and the control unit 31 controls the operation of the processing unit 20 to switch the standard signal.

As illustrated in FIG. 4, times at which the DOP is the threshold value are t2 and t3. In this case, the first standard signal is output until time t2 and is switched to the second standard signal at time t2. The second standard signal is output from time t2 to time t3 and is switched to the first standard signal at time t3. Then, the first standard signal is output from time t3.

By switching the standard signal based on the prior information in this way, it is possible to typically output the reference signal with good accuracy and thus ensure the accuracy of the standard signal.

In the control of the switch of the standard signal, time t2 and time t3 may be stored and the standard signal may be configured to be switched at time t2 and time t3.

As described above, time t2 and time t3 may be switching times. However, in consideration of an error or the like, the standard signal is preferably switched at a time earlier by predetermined time T1 than t2 and at a time later by predetermined time T2 than t3. The times T1 and T2 are time information and are stored in advance in the time information storage unit 333.

The prior information output unit 33 outputs the DOP information and the time information to the switch timing decision unit 311 of the control unit 31. Then, the switch timing decision unit 311 decides the switch timing of the standard signal based on the DOP information, the threshold value, and the time information, as will be described below, and the control unit 31 controls the operation of the processing unit 20 to switch the standard signal.

That is, the first standard signal is output until time t1 and is switched to the second standard signal at time t1. The second standard signal is output from time t1 to time t4 and is switched to the first standard signal at time t4. Then, the first standard signal is output from time t4.

Accordingly, it is possible to output the standard signal with good accuracy more reliably, and thus it is possible to ensure the accuracy of the standard signal.

T1 and T2 are not particularly limited and are appropriately set according to all the conditions. T1 and T2 are preferably equal to or less than 30 minutes, are more preferably equal to or less than 15 minutes, and are further more preferably equal to or greater than 1 second and equal to or less than 5 minutes. T1 and T2 may be the same or may be different.

When T1 and T2 are longer than the upper limit, the accuracy of the first reference signal is insufficient in some cases depending on other conditions.

In the control of the switching of the standard signal, time t1 and time t4 may be stored. At time t1 and time t4, the standard signal may be configured to be switched.

In the timing signal generation device 1, the user obtains the DOP information before use of the DOP information, stores the DOP information in the prior information storage unit 332, stores the threshold value in the threshold value storage unit 312, and stores the time information in the time information storage unit 333. Needless to say, any one, two, or all of the pieces of information may be stored in advance.

In the timing signal generation device 1, the timing signal generation device 1 may be operated in advance, the prior information generation unit 331 may generate (create) the DOP information, and the DOP information may be stored in the prior information storage unit 332. In this case, the GPS receiver generates the DOP information based on the received satellite signals. As described above, the relation between a time and the DOP is not uniform every day and is shifted every day. Therefore, the prior information generation unit 331 generates the DOP information in addition to the shift. Accordingly, more accurate DOP information can be obtained.

In the timing signal generation device 1, when the DOP is equal to or less than the threshold value, information for obtaining a correction value of aging correction of the crystal oscillator 30, that is, information regarding the control voltage of the crystal oscillator 30 input from the loop filter 22 to the crystal oscillator 30, is acquired. The information regarding the control voltage is stored in a storage unit (not illustrated). When the DOP exceeds the threshold value, the control voltage of the crystal oscillator 30 including the correction value of the aging correction of the crystal oscillator 30 is obtained based on the information regarding the control voltage, the control voltage is input to the crystal oscillator 30, the crystal oscillator 30 is caused to perform free-running, and the second standard signal is output to the outside. Accordingly, when the second standard signal is output, the aging correction of the crystal oscillator 30 can be performed, and thus the temporal accuracy of the second standard signal can be improved.

Specifically, as illustrated in FIG. 5, the information regarding the control voltage of the crystal oscillator 30 output from the loop filter 22 is acquired until time t2 at which the DOP is the threshold value.

When the DOP exceeds the threshold value, that is, from time t2 to time t3, the control voltage of the crystal oscillator 30 including the correction value of the aging correction of the crystal oscillator 30 is obtained based on the information regarding the control voltage until time t2. That is, the control voltage of the crystal oscillator 30 at a corresponding time is obtained based on a function (calculation formula) of a curve indicating a relation between a time and the control voltage of the crystal oscillator 30 until time t2 illustrated in FIG. 5. Then, the obtained control voltage is input to the crystal oscillator 30 from time t2 to time t3, the crystal oscillator 30 is caused to perform free-running, and the second standard signal is output to the outside.

The information regarding the control voltage of the crystal oscillator 30 output from the loop filter 22 is acquired from time t3, as described above. When the DOP exceeds the threshold value, as described above, the control voltage of the crystal oscillator 30 including the correction value of the aging correction of the crystal oscillator 30 is obtained based on the information regarding the control voltage.

As described above, the DOP information is used in the timing signal generation device 1. Then, when the accuracy of the 1 PPS output by the GPS receiver 10 is high, the first standard signal with higher accuracy than the accuracy of the crystal oscillator 30 can be generated and output by synchronizing the clock signal output by the crystal oscillator 30 with the accurate 1 PPS output by the GPS receiver 10.

When the accuracy of the 1 PPS output by the GPS receiver 10 is low, the second standard signal with at least the frequency accuracy of the crystal oscillator 30 can be output by stopping the process of synchronizing the clock signal output by the crystal oscillator 30 with the 1 PPS output by the GPS receiver 10 and causing the crystal oscillator 30 to perform free-running.

Since the DOP information is stored in advance in the prior information storage unit 332 and the standard signal is switched based on the DOP information, the standard signal can be switched from the first standard signal to the second standard signal before deterioration in the accuracy of the 1 PPS output by the GPS receiver 10. Accordingly, it is possible to typically output the reference signal with good accuracy and thus ensure the accuracy of the standard signal.

Since the accuracy of the standard signal can be ensured without disposing the antenna 50 at a high position, it is possible to reduce cost to that extent.

Second Embodiment

Figure 6:
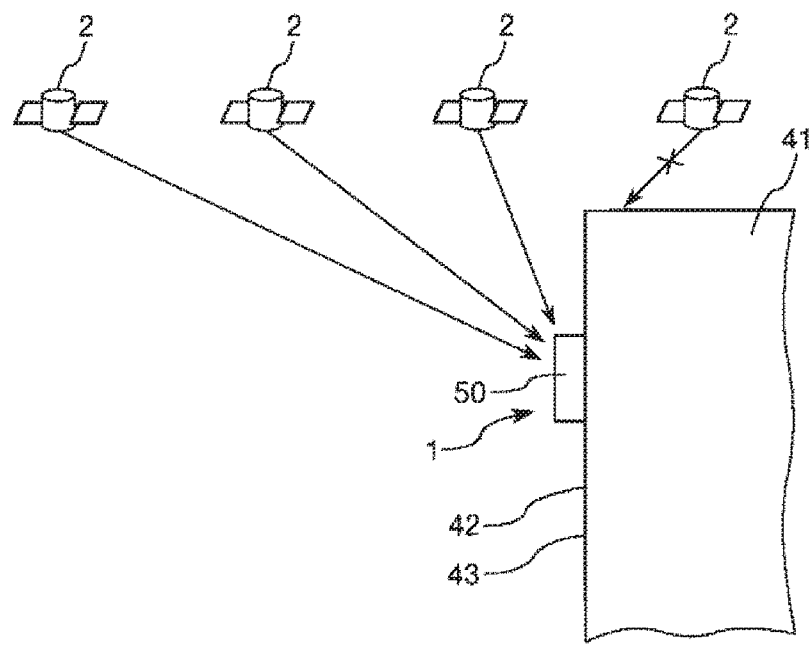
FIG. 6 is a diagram illustrating a schematic configuration of main units of a second embodiment of the timing signal generation device according to the invention.
Figure 7:
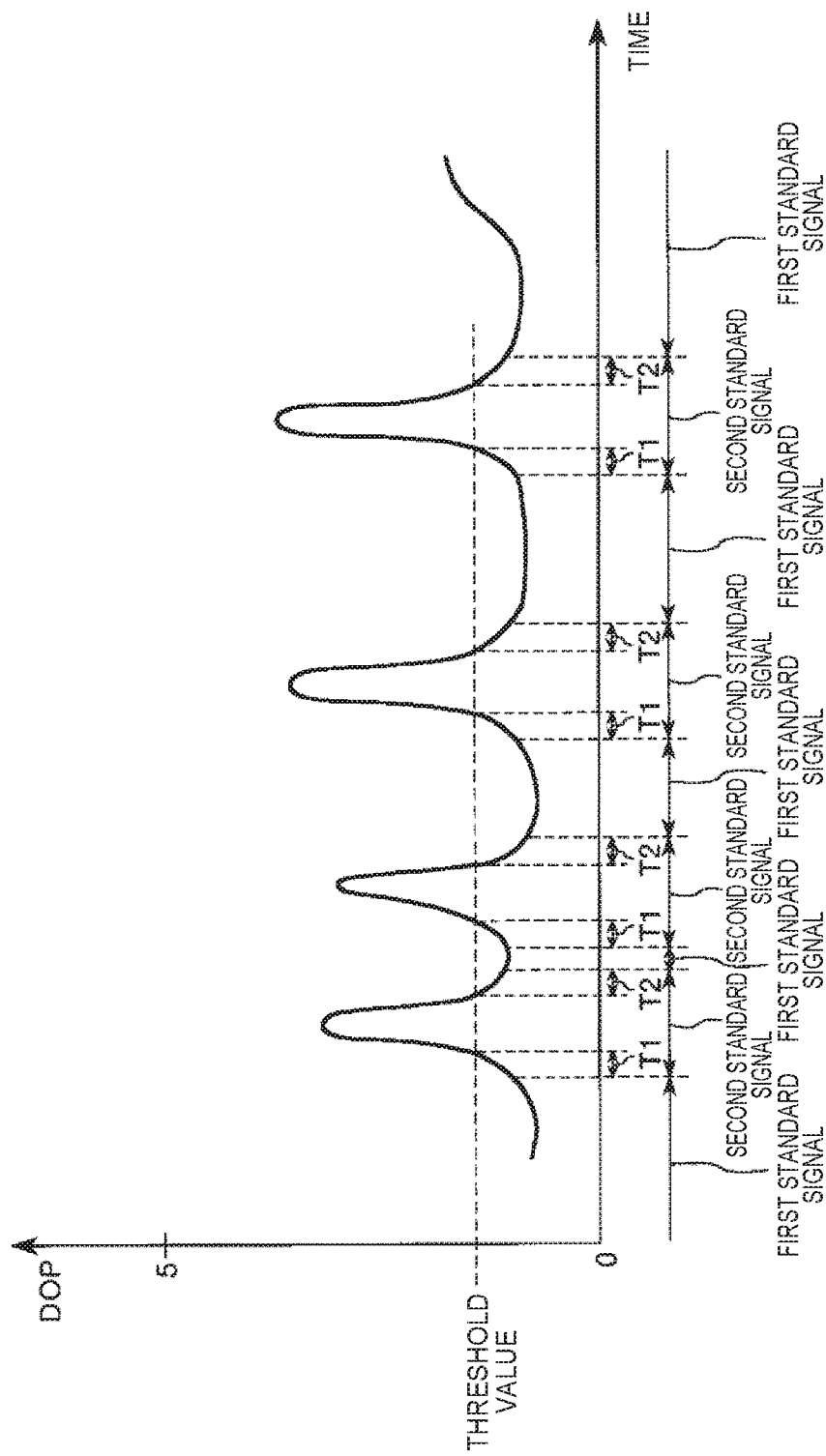
FIG. 7 is a graph illustrating a relation between a time and an accuracy deterioration rate of a satellite signal in the timing signal generation device illustrated in FIG. 6.

FIG. 6 is a diagram illustrating a schematic configuration of main units of a second embodiment of the timing signal generation device according to the invention. FIG. 7 is a graph illustrating a relation between a time and an accuracy deterioration rate of a satellite signal in the timing signal generation device illustrated in FIG. 6.

In the second embodiment, differences from the above-described first embodiment will be mainly described below and the description of the same matters will be omitted.

As illustrated in FIG. 6, in the timing signal generation device 1 according to the second embodiment, the GPS antenna 50 is installed in an outside surface 43 of a wall 42 of a building 41. The GPS antenna 50 is disposed at a position lower than the height of the building 41.

In this case, depending on a period of time (time), some of the radio waves sent from four GPS satellites 2 may be blocked by the building 41 in some cases. In the example illustrated in FIG. 6, one of the radio waves sent from the four GPS satellites 2 is blocked by the building 41 during a predetermined period of time. Accordingly, one of the four satellite signals is not received by the GPS receiver 10 via the antenna 50, and the DOP becomes high.

In the timing signal generation device 1, the DOP information is stored as the prior information in advance in addition to the foregoing situation in the prior information storage unit 332. As described in the first embodiment, the standard signal is switched. As illustrated in FIG. 7, in the embodiment, when the DOP is high, the standard signal is switched accordingly four times in a day in the timing signal generation device 1.

In the embodiment, instead of the DOP information, for example, information indicating the period of time in which at least one of the satellite signals sent from the four GPS satellites 2 may not be received by the GPS receiver 10 via the antenna 50 due to the fact that at least one of the four GPS satellites 2 is at a dead angle for the antenna 50 may be stored as the prior information in advance in the prior information storage unit 332.

In this case, before a predetermined time of a time (timing) at which the dispositions of the GPS satellites 2 in which the four satellite signals can be received are changed to the positions of the GPS satellites 2 in which one satellite signal may not be received, the standard signal is switched from the first standard signal to the second standard signal. In contrast to the foregoing, after a predetermined time of a time (timing) at which the dispositions of the GPS satellites 2 in which one satellite signal may not be received are changed to the positions of the GPS satellites 2 in which the four satellite signals can be received, the standard signal is switched from the second standard signal to the first standard signal. As described in the first embodiment, the predetermined time may be 0, that is, the predetermined time may not be provided. The predetermined time in the case of the switching of the standard signal from the first standard signal to the second standard signal and the predetermined time in the case of the switching of the standard signal from the second standard signal to the first standard signal may be the same or may be different.

In the timing signal generation device 1, it is possible to obtain the same advantages as the above-described first embodiment.

2. Electronic Apparatuses

Next, an embodiment of an electronic apparatus according to the invention will be described.

Figure 8:
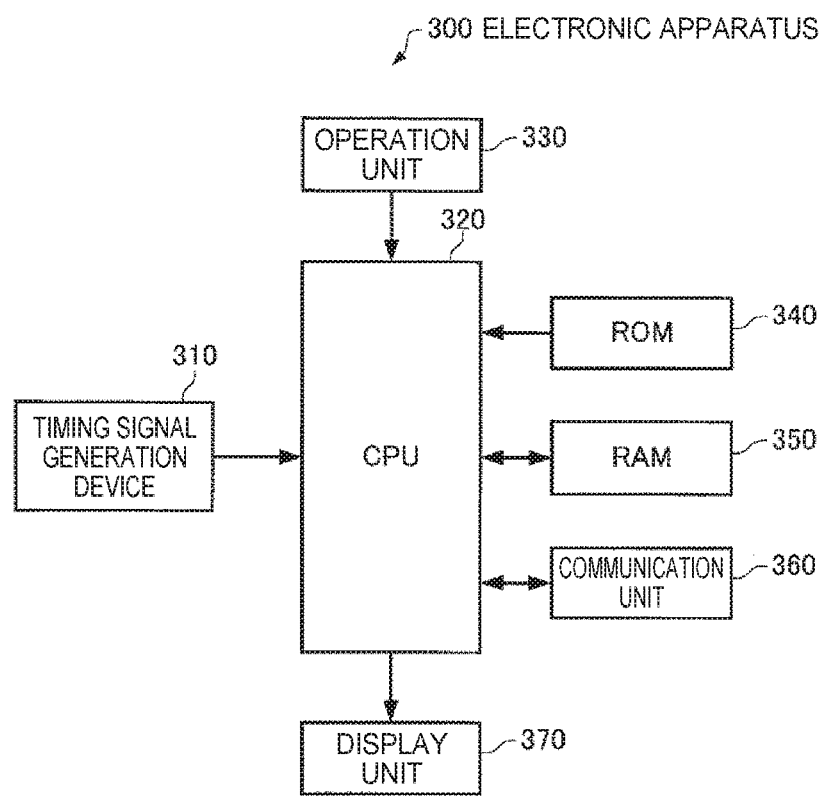
FIG. 8 is a block diagram illustrating an embodiment of an electronic apparatus according to the invention.

FIG. 8 is a block diagram illustrating an embodiment of an electronic apparatus according to the invention.

An electronic apparatus 300 illustrated in FIG. 8 includes a timing signal generation device 310, a central processing unit (CPU) 320, an operation unit 330, a read-only memory (ROM) 340, a random access memory (RAM) 350, a communication unit 360, and a display unit 370.

The timing signal generation device 310 is, for example, the timing signal generation device 1 according to any one of the first and second embodiments described above. As described above, the timing signal generation device 310 receives the satellite signals, generates the highly accurate timing signal (1 PPS), and outputs the timing signal to the outside. Accordingly, the electronic apparatus 300 with high reliability can be realized at low cost.

The CPU 320 performs various calculation processes and control processes according to programs stored in the ROM 340 or the like. Specifically, to perform a clocking process in synchronization with a timing signal (1 PPS) or a clock signal output by the timing signal generation device 310, various processes according to operation signals from the operation unit 330, and data communication with the outside, the CPU 320 performs, for example, a process of controlling the communication unit 360 and a process of transmitting a display signal for displaying various kinds of information to the display unit 370.

The operation unit 330 is an input device configured to include an operation key or a button switch and outputs an operation signal according to an operation by a user to the CPU 320.

The ROM 340 stores data or programs used for the CPU 320 to perform various calculation processes or control processes.

The RAM 350 is used as a work area of the CPU 320 and temporarily stores, for example, data or a program read from the ROM 340, data input from the operation unit 330, and calculation results obtained when the CPU 320 executes various programs.

The communication unit 360 performs various kinds of control to establish data communication between the CPU 320 and an external device.

The display unit 370 is a display device configured to include a liquid crystal display (LCD) and displays various kinds of information based on display signals input from the CPU 320. A touch panel functioning as the operation unit 330 may be installed in the display unit 370.

Any of various electronic apparatuses is considered as the electronic apparatus 300 and the invention is not particularly limited thereto. Examples of the electronic apparatus include a server (time server) for time management realizing synchronization with a standard time, a time management apparatus (timestamp server) performing issuing of a timestamp or the like, and a frequency standard apparatus such as a base station.

The timing signal generation device and the electronic apparatus according to the invention have been described according to the illustrated embodiments, but the invention is not limited thereto. The configuration of each unit can be substituted with any configuration having the same function. Any other constituent element may be added.

The invention may be a combination of the configurations (characteristics) of any two or more of the above-described embodiments.

In the foregoing embodiments, the timing signal generation device using the GPS has been exemplified. However, the invention is not limited to the GPS, but a Global Navigation Satellite System (GNSS) other than the GPS, for example, Galileo or GLONASS, may be used.

What is claimed is:

1. A timing signal generation device comprising:
   an output terminal that outputs a standard signal;
   a first standard signal generation unit that generates a first standard signal based on a reference signal input from outside;
   a second standard signal generation unit that generates a second standard signal based on a signal output from an oscillator; and
   a control unit that switches the standard signal output from the output terminal from the first standard signal to the second standard signal based on prior information indicating that accuracy of the reference signal deteriorates.

2. The timing signal generation device according to claim 1, further comprising:
   a prior information output unit that outputs the prior information to the control unit.

3. The timing signal generation device according to claim 2, wherein the prior information output unit includes a prior information storage unit that stores the prior information.

4. An electronic apparatus comprising:
the timing signal generation device according to claim 3.

5. The timing signal generation device according to claim 2,
wherein the prior information output unit includes a prior information generation unit that generates the prior information based on the reference signal.

6. An electronic apparatus comprising:
the timing signal generation device according to claim 5.

7. The timing signal generation device according to claim 2, further comprising:
a time information storage unit that stores time information,
wherein the control unit includes a switch timing decision unit that decides a switch timing of the standard signal based on the prior information and the time information.

8. The timing signal generation device according to claim 7,
wherein the reference signal is a satellite signal transmitted from a position information satellite,
wherein the prior information output unit outputs dilution of precision information indicating a relation between a time and an accuracy deterioration rate of positioning based on the reference signal as information indicating that the accuracy of the reference signal deteriorates to the switch timing decision unit, and
wherein the switch timing decision unit includes a threshold value storage unit that stores a threshold value and decides the switch timing of the standard signal based on the threshold value and the dilution of precision information.

9. The timing signal generation device according to claim 8,
wherein the oscillator is a voltage control oscillator,
wherein the first standard signal generation unit inputs a control voltage of the oscillator to the oscillator and generates the first standard signal based on the reference signal when the accuracy deterioration rate is equal to or less than the threshold value, and
wherein the control unit acquires information regarding a control voltage of the oscillator input to the oscillator when the accuracy deterioration rate is equal to or less than the threshold value, and the control unit obtains a control voltage input to the oscillator based on the acquired information regarding the control voltage and inputs the obtained control voltage to the oscillator to switch the reference signal output from the output terminal from the first standard signal to the second standard signal when the accuracy deterioration rate exceeds the threshold value.

10. An electronic apparatus comprising:
the timing signal generation device according to claim 9.

11. An electronic apparatus comprising:
the timing signal generation device according to claim 8.

12. An electronic apparatus comprising:
the timing signal generation device according to claim 7.

13. An electronic apparatus comprising:
the timing signal generation device according to claim 2.

14. The timing signal generation device according to claim 1,
wherein the reference signal is a satellite signal transmitted from a position information satellite, and
wherein the first standard signal generation unit includes a receiver that receives the satellite signal.

15. An electronic apparatus comprising:
the timing signal generation device according to claim 14.

16. The timing signal generation device according to claim 1,
wherein the prior information includes information indicating that the accuracy of the reference signal improves, and
wherein the control unit switches the standard signal output from the output terminal from the second standard signal to the first standard signal based on the prior information.

17. An electronic apparatus comprising:
the timing signal generation device according to claim 16.

18. An electronic apparatus comprising:
the timing signal generation device according to claim 1.

19. A timing signal generation device that switches, based on prior information indicating that accuracy of a reference signal input from outside deteriorates, a signal used to generate a standard signal from the reference signal to a signal output from an internal oscillator.

20. An electronic apparatus comprising:
the timing signal generation device according to claim 19.

* * * * *